May 26, 1953
H. F. VICKERS
2,639,785
TOP SHOE BRAKE OPERATOR
Filed March 18, 1950
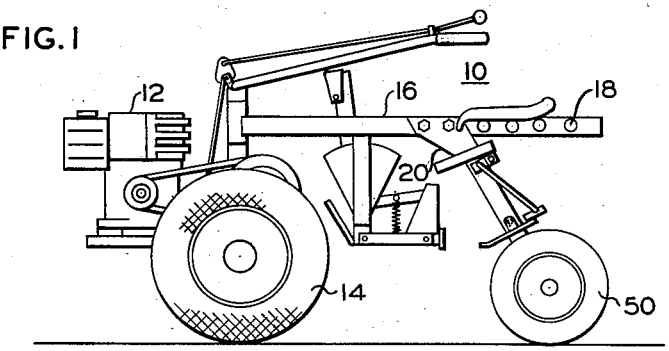
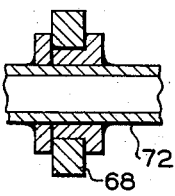
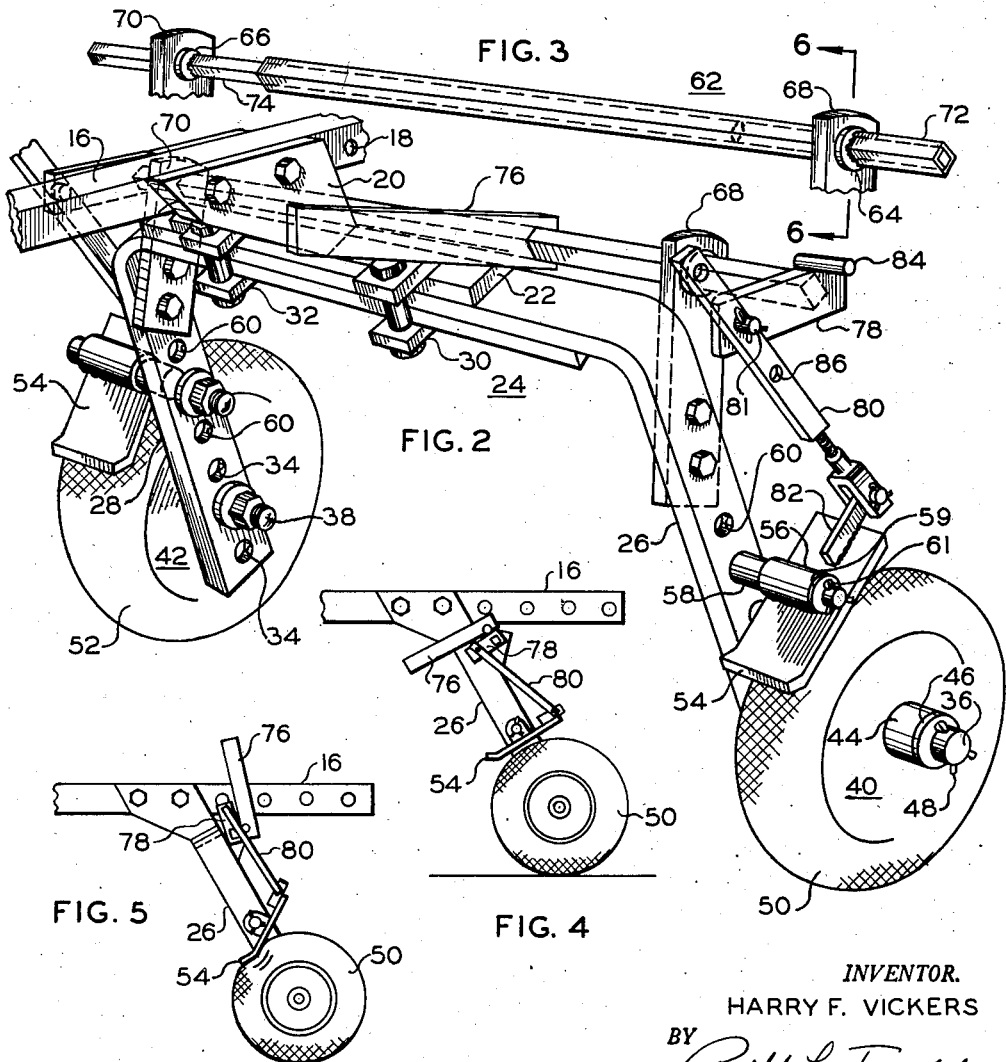
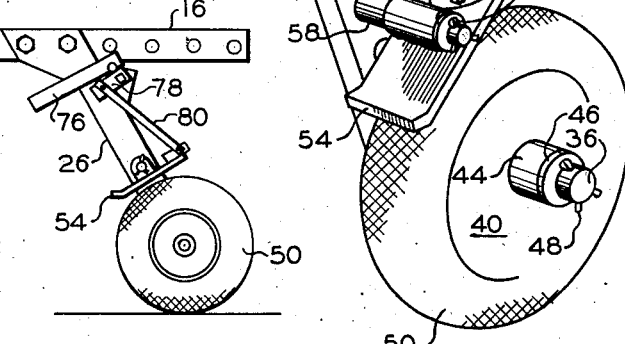
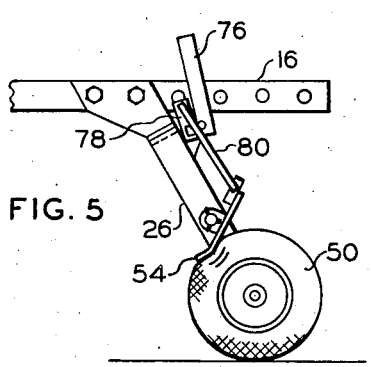
*INVENTOR.*
HARRY F. VICKERS
BY Ralph L. Tweedale
ATTORNEY Patented May 26, 1953

2,639,785

UNITED STATES PATENT OFFICE 2,639,785

TOP SHOE BRAKE OPERATOR

Harry F. Vickers, Detroit, Mich., assignor to Vickers Incorporated, Detroit, Mich., a corporation of Michigan Application March 18, 1950, Serial No. 150,501

7 Claims. (Cl. 188—29)

This invention relates to power transmissions and more particularly to an improved form of brake system for light, power-driven garden tractors, wheeled trailers, farm implements, and other vehicles.

Tractors of this type have come into wide use for light agricultural work and generally comprise a wheeled chassis having an engine and transmission associated with the traction wheels for driving the same, and provided with suitable means enabling the operator to ride while using the tractor with either front or rear implements, or both.

Tractors of this type may also be provided with means for adjusting the tread width of the trailing wheels and also for individually adjusting the vertical height of said wheels.

It is an object of this invention to provide an improved braking system readily adaptable for light, power-driven garden and farming tractors.

It is a further object of this invention to provide for tractors of the above type, having means for adjusting the tread width of a pair of wheels thereof, an improved braking system which is automatically adjustable with any adjustment in tread width of the wheels.

It is another object of the invention to provide for tractors of the above type, having means for adjusting the vertical height of a pair of trailing wheels of the tractor, an improved braking system which may be easily adjusted to compensate for adjustment in height of the trailing wheels.

It is still another object of this invention to provide for tractors of the above type an improved braking system which includes an economical overcenter toggle linkage in conjunction with a brake applying lever for operating the brakes of the tractor.

It is still another object of this invention to provide for tractors of the above type having resilient tired wheels, an overcenter toggle linkage in conjunction with a brake applying lever which cooperates with the resilient tire to maintain the brake in operating position.

Further objects and advantages of the present invention will be apparent from the following description, reference being had to the accompanying drawing wherein a preferred form of the present invention is clearly shown.

In the drawing:

Figure 1 is a side view of a tractor incorporating a preferred form of the present invention.

Figure 2 is a fragmentary perspective view of the rear part of the tractor shown in Figure 1.

Figure 3 is a fragmentary perspective view showing in more detail a portion of the braking mechanism shown in Figure 2.

Figure 4 is a fragmentary perspective view of the rear portion of the tractor shown in Figure 1 and illustrating the braking system in the off-position.

Figure 5 is a view similar to that of Figure 4, but illustrating the braking system in the operating or on-position.

Figure 6 is a fragmentary section on line 6—6 of Figure 3.

Referring to Figure 1, there is shown a light garden or farming tractor chassis 10 having a suitably mounted engine 12 for driving the traction wheels 14. The chassis may be provided with a rearwardly extending longitudinal bar 16 provided with a plurality of spaced holes 18, thus providing means for bolting a side plate 20 in any of a plurality of positions. Referring to Figure 2, the plate 20 may be suitably welded or otherwise secured to a main cross plate 22 which forms part of a downwardly extending yoke 24 of substantially inverted U form. The yoke 24 is comprised of two inverted substantially L shaped members indicated by the numerals 26 and 28 which may be suitably frictionally secured to the main cross plate 22 by means of clamping plates 30 and 32. The downwardly extending portions of the L members 26 and 28 are provided with a plurality of spaced holes 34 in which stub axles 36 and 38 for the trailing wheels 40 and 42 may be mounted and suitably bolted to the L members. Each wheel is provided with a hub 44 and the wheel is maintained on the axle by a washer and cotter pin arrangement indicated by the numerals 46 and 48. Each trailing wheel is also provided with a resilient tire, which preferably are of the pneumatic type, and which are indicated by the numerals 50 and 52.

A braking system has been provided for the trailing wheels of the tractor which automatically adjusts itself to adjustments in tread width of the trailing wheels, and which may be easily adjusted to compensate for individual vertical adjustment of the wheels.

Thus, a friction brake shoe 54 is provided for each of the trailing wheels having a sleeve bearing 56 welded thereto at its central portion. Each brake shoe 54 is oscillatably mounted on its respective L member by a stub shaft 58 suitably bolted to the L member which, when inserted through the bearing 56, acts as a trunnion or journal for the shoe 54. The shoe 54 is maintained on the shaft 58 by means of a washer and cotter pin arrangement indicated by the numerals 59 and 61. Each L member is provided with a plurality of spaced holes 60 for the shafts 58, thus providing a means for individual vertical adjustment of the brake shoe.

The brake actuating mechanism includes a two-section telescopically arranged shaft 62, each section of which is separately mounted in bearings 64 and 66 carried respectively by upwardly extending supporting members 68 and 70 which are respectively bolted to the L members 26 and 28. The two-section shaft 62, as shown more clearly in Figure 3, comprises an outer tube 72 preferably of non-circular form, and an inner tube 74 of the same form which is telescopically arranged within the outer tube 72 so as to be oscillatable with the outer tube when a manually operated brake lever 76 connected to the outer tube 72 is oscillated, and so that the length of the shaft 62 may be automatically adjusted when the tread width of the trailing wheels is adjusted.

Mechanically associated with the shaft 62 and each brake shoe 54 is an overcenter toggle linkage comprising a relatively short lever 78 and a link 80. One of the levers 78 is suitably connected to the outer end of the outer tube while the other lever is connected at one end to the outer end of the inner tube. Each lever 78 is pivotally connected at its opposite end at a point indicated by the numeral 81 to the link 80 while the opposite end of the link 80 is pivotally connected to a member 82 welded to and extending from the brake shoe 54. Each lever 78 is provided with a stop pin 84 welded thereto adapted to limit the travel of the link as it passes overcenter or out of alignment with the lever when the brakes are actuated. A plurality of spaced holes 86 are provided in the link 80 to compensate for adjustments in vertical height of the trailing wheels. The link 80 is preferably made in two sections and connected together by the conventional male and female thread arrangement for the purpose of adjusting the brake shoe position.

In the position shown in Figures 2 and 4, the brakes are in the off-position. When the operator oscillates the lever 76 upwardly, the two sections of the shaft 62, namely outer section 72 and inner section 74, are oscillated, and the levers 78 oscillate therewith. The link 80, which is pivotally connected to the lever 78 and to the brake shoe 54, follows the movement of the lever to bring the brake shoe 54 in contact with the tire of the trailing wheel. Since contact of the shoe with the resilient tire of the wheel takes place considerably prior to the link 80 passing to the center position, i. e., in alignment with the lever 78, the brake may be applied manually to any desired degree. Maximum brake application takes place when the lever and link are in alignment with each other. A continued application of the brakes brings the link 80 past the center position or out of alignment with the lever 78, and there is a tendency for the brake shoe to oscillate in the opposite direction. However, the stop pin 84 prevents further movement, and as the tire is still compressed by the shoe 54, a force is created by the compressed resilient tire which maintains the link 80 against the stop pin 84, and thus maintains the brakes in the locked position. Thus, without manual operation, the lever 76 is maintained in position, and the tractor may be parked. To release the brakes, the operator must oscillate the lever 76 in the opposite direction, and when the link 80 and lever 78 pass out of alignment or past the center position, the brake shoe loses contact with the tire.

It should be noted that the braking system co-operates with the adjustable features of the rear part of the chassis which enables the tractor to be readily adapted to a wide variety of implement operating conditions. The trailing wheels may be adjusted to various heights individually, as for example, when it is desired to let one of them ride the bottom of a furrow and the other ride the unplowed ground. This adjustment is made by shifting the stub axle to any one of the three holes 34 provided in the L members. When a vertical adjustment of a wheel is made, the brake shoe may be vertically adjusted by shifting the stub shaft 58 to another of the holes 60 in the L member, and the pivotal connection of the link 80 to the lever 78 is also shifted by the provision of the spaced holes 86, thus creating a new pivotal connection point of the link to the lever.

The rear wheel tread adjustment adapts the tractor for use with various crop row spacings. When the tread width of the trailing wheels is adjusted, the brake shoe, link, and associated lever follow the adjustment automatically because the brake shoe shaft is connected to the L member, and the link 80 and lever 78 follow the movement of the transversely extensible shaft 62 which is extended or shortened to follow the adjustment in tread width of the wheels.

While the form of embodiment of the invention as herein disclosed constitutes a preferred form, it is to be understood that other forms might be adopted, all coming within the scope of the claims which follow.

What is claimed is as follows:

1. In a tractor having a pair of wheels, means for adjustably positioning the wheels at various tread spacings with respect to each other, a brake associated with each wheel, an overcenter toggle linkage connected to each brake, a brake applying lever, and a transverse shaft rotatably mounted for transmitting motion from the brake applying lever to said linkage, said shaft including at least two telescoping noncircular parts, whereby the brakes may be operated with the wheels positioned at any tread spacing.

2. In a tractor having a pair of wheels, means for adjustably positioning the wheels at various tread spacings with respect to each other, a brake associated with each wheel, an overcenter toggle linkage connected to each brake, a brake applying lever, and a transversely extensible oscillatory shaft rotatably mounted for transmitting motion from the brake applying lever to said linkage, whereby the brakes may be operated with the wheels positioned at any tread spacing.

3. In a tractor having a pair of wheels, means for adjustably positioning the wheels at various tread spacings with respect to each other, a brake for each wheel comprising a brake shoe oscillatably mounted adjacent each wheel and shiftable transversely therewith upon adjustments in wheel tread spacings, an overcenter toggle linkage connected to each brake shoe comprising a link pivotally connected to the brake shoe and a brake applying lever pivotally connected to the link, a manually operated brake lever, and an oscillatably mounted shaft connected to the levers for transmitting motion from the manually operated lever to the brake shoes, said shaft being in two sections and transversely extensible whereby the brake shoes may be operated with the wheels positioned at any tread spacing.

4. In a tractor having a pair of resilient tired wheels, means for adjustably positioning the wheels at various tread spacings with respect to each other, a brake comprising a tire engaging shoe oscillatably mounted adjacent each tire, an overcenter toggle linkage for each brake comprising a link pivotally connected to the shoe, and a lever pivotally connected to the link, a manually operated lever, a shaft rotatably mounted for transmitting motion from the manually operated lever to the overcenter toggle linkage, said shaft being transversely extensible so that the brakes may be operated with the wheels positioned at any tread spacing, and said lever and link being arranged so that when the shoe is in tight engagement with the tire, the lever and link are substantially in alignment, whereby the lever, when shifted past the position of alignment, tends to move farther in the same direction, and abutment means for limiting overtravel of the lever in that direction and cooperating with the resilient tire to maintain the brakes in operating position.

5. In a tractor having a pair of resilient tired wheels, means for adjustably positioning the wheels at various tread spacings with respect to each other, a brake for each tire comprising a tire engaging shoe oscillatably mounted adjacent the tire and automatically adjustable transversely with adjustments in tread spacings of the wheels, a link and a lever for each brake shoe, said link being pivotally connected to the brake shoe and pivotally connected to the lever, a two-section, transversely adjustable shaft oscillatably mounted and connected at opposite ends to the levers for oscillating the same, a manually operated lever for oscillating the shaft and transmitting motion to the brake levers, said lever and link being arranged so that the lever and link are in alignment when the shoe is in tight engagement with the tire and the lever tending to move past the position of alignment in the same direction, and abutment means for limiting overtravel of the lever in that direction.

6. In a tractor having a pair of wheels, means for adjustably positioning the wheels at various heights with respect to each other, a brake associated with each wheel, an overcenter toggle linkage connected to each brake, a brake applying lever, a transverse shaft rotatably mounted for transmitting motion from the brake applying lever to said linkage, and means for adjusting each toggle linkage and the brake to compensate for adjustments in height of the wheels.

7. In a tractor having a pair of wheels, means for adjustably positioning the wheels at various tread spacings with respect to each other, means for adjustably positioning the wheels at various heights with respect to each other, a brake associated with each wheel including means for adjustably positioning the brake to correspond with adjustments in height of the wheel, an overcenter toggle linkage connected to each brake, a brake applying lever, a transverse shaft rotatably mounted for transmitting motion from the brake applying lever to said linkage, said shaft including at least two telescoping parts whereby the brakes may be operated with the wheels positioned at any tread spacing, and means for adjusting the toggle linkage to compensate for adjustments in height of the wheels.

HARRY F. VICKERS.

References Cited in the file of this patent

UNITED STATES PATENTS

| Number | Name | Date |
|---|---|---|
| 171,754 | Adamy et al. | Jan. 4, 1876 |
| 489,997 | Sweet | Jan. 17, 1893 |
| 1,321,107 | Kidney | Nov. 11, 1919 |
| 1,341,851 | Hicks | June 1, 1920 |
| 2,218,510 | Albertson et al. | Oct. 22, 1940 |
| 2,457,821 | Johnson | Jan. 4, 1949 |